(12) United States Patent
Fujigaki

(10) Patent No.: US 9,977,794 B2
(45) Date of Patent: May 22, 2018

(54) MANAGEMENT APPARATUS, DESIGN MANAGEMENT METHOD, AND NON-TRANSITORY COMPUTER READABLE MEDIUM

(71) Applicant: FUJI XEROX CO., LTD., Minato-ku, Tokyo (JP)

(72) Inventor: Makoto Fujigaki, Yokohama (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 337 days.

(21) Appl. No.: 14/542,127

(22) Filed: Nov. 14, 2014

(65) Prior Publication Data
US 2015/0356120 A1 Dec. 10, 2015

(30) Foreign Application Priority Data
Jun. 10, 2014 (JP) ................................ 2014-119683

(51) Int. Cl.
*G06K 9/68* (2006.01)
*G06F 17/30* (2006.01)
*G06K 9/62* (2006.01)
*G06F 17/24* (2006.01)

(52) U.S. Cl.
CPC ...... *G06F 17/30268* (2013.01); *G06F 17/248* (2013.01); *G06F 17/30634* (2013.01); *G06K 9/6215* (2013.01)

(58) Field of Classification Search
CPC ............. G06F 17/248; G06F 17/30268; G06F 17/30634; G06K 9/6215
See application file for complete search history.

(56) References Cited

U.S. PATENT DOCUMENTS

| | | | | |
|---|---|---|---|---|
| 5,140,644 A * | 8/1992 | Kawaguchi | ....... | G06F 17/30985 382/226 |
| 5,377,319 A * | 12/1994 | Kitahara | ............ | G06F 3/04895 345/473 |
| 6,006,221 A * | 12/1999 | Liddy | ............... | G06F 17/30011 |
| 6,738,515 B1 * | 5/2004 | Akagi | .................. | G06K 9/6206 382/187 |
| 7,356,458 B1 * | 4/2008 | Gonos | .................. | G06F 17/218 704/8 |
| 7,792,850 B1 * | 9/2010 | Raffill | ...................... | G06F 7/02 707/758 |
| 8,006,186 B2 * | 8/2011 | Kellock | .............. | G11B 27/034 715/721 |

(Continued)

FOREIGN PATENT DOCUMENTS

JP 2006-221600 A 8/2006

*Primary Examiner* — Iman K Kholdebarin
(74) *Attorney, Agent, or Firm* — Sughrue Mion, PLLC

(57) ABSTRACT

A design management apparatus is provided for presenting a template used to create a design. The design management apparatus may include a calculator that receives multiple templates having multiple character strings as predetermined samples and calculates a score for each character string in each template, where the score concerns a subject of the template and corresponds to a size of the character string. Moreover, the design management apparatus may receive information indicating a search subject to output the template including the character string which corresponds to the search subject and the score of which meets an output condition.

11 Claims, 10 Drawing Sheets

(56) References Cited

U.S. PATENT DOCUMENTS

| | | | | |
|---|---|---|---|---|
| 8,787,660 B1* | 7/2014 | Simon | G06K 9/6828 | 345/468 |
| 9,256,795 B1* | 2/2016 | Gray | G06K 9/2054 | |
| 2005/0168778 A1* | 8/2005 | Abe | G06F 17/211 | 358/1.18 |
| 2006/0067759 A1* | 3/2006 | Osaka | G03G 21/046 | 399/366 |
| 2006/0080310 A1* | 4/2006 | Gordon | G06F 17/30719 | |
| 2006/0198555 A1* | 9/2006 | Hosotsubo | G06T 11/60 | 382/162 |
| 2007/0071291 A1* | 3/2007 | Yumoto | G06F 3/03547 | 382/124 |
| 2007/0079236 A1* | 4/2007 | Schrier | G06F 17/217 | 715/206 |
| 2007/0130145 A1* | 6/2007 | Pedersen | G06F 17/30011 | |
| 2008/0154848 A1* | 6/2008 | Haslam | G06F 17/30011 | |
| 2009/0213425 A1* | 8/2009 | Oishi | H04N 1/00222 | 358/1.15 |
| 2009/0238474 A1* | 9/2009 | Sandberg | G06K 9/723 | 382/229 |
| 2009/0327875 A1* | 12/2009 | Kinkoh | G06F 17/248 | 715/255 |
| 2011/0038512 A1* | 2/2011 | Petrou | G06F 17/30256 | 382/118 |
| 2011/0057947 A1* | 3/2011 | Kobayashi | G09G 5/26 | 345/592 |
| 2011/0161144 A1* | 6/2011 | Mizuguchi | G06F 17/2775 | 705/14.4 |
| 2011/0234601 A1* | 9/2011 | Yasuta | G06F 17/24 | 345/467 |
| 2011/0279379 A1* | 11/2011 | Morwing | G06F 3/0237 | 345/173 |
| 2011/0320933 A1* | 12/2011 | Sanami | G06F 17/212 | 715/246 |
| 2012/0304052 A1* | 11/2012 | Tanaka | G06T 11/60 | 715/243 |
| 2012/0328169 A1* | 12/2012 | Heeter | G06T 11/60 | 382/118 |
| 2013/0117303 A1* | 5/2013 | Morimatsu | G06F 17/3053 | 707/769 |
| 2013/0262988 A1* | 10/2013 | Nakagawa | G06F 17/211 | 715/243 |
| 2014/0013212 A1* | 1/2014 | Von Haden | G06F 17/248 | 715/243 |
| 2014/0181672 A1* | 6/2014 | Zhang | G06F 3/167 | 715/728 |
| 2014/0195561 A1* | 7/2014 | Obayashi | G06F 17/30964 | 707/772 |
| 2014/0288946 A1* | 9/2014 | Shinohara | G06Q 30/0241 | 705/2 |
| 2014/0289238 A1* | 9/2014 | Fume | G06F 17/214 | 707/728 |
| 2014/0355835 A1* | 12/2014 | Rodriguez-Serrano | G06K 9/72 | 382/105 |
| 2015/0278163 A1* | 10/2015 | Kinkoh | G06F 17/212 | 715/244 |
| 2015/0324334 A1* | 11/2015 | Lee | G06F 17/28 | 715/208 |
| 2015/0339284 A1* | 11/2015 | Ban | G06F 17/248 | 715/235 |
| 2015/0363381 A1* | 12/2015 | Otaki | G06F 17/248 | 715/234 |
| 2016/0012288 A1* | 1/2016 | Goto | G06K 9/38 | 382/137 |

* cited by examiner

SUBJECT SCORE TABLE

| WORD | SUBJECT SCORE | FONT SIZE |
|---|---|---|
| FREE | 100 | 25 pt |
| DRINK | 100 | 25 pt |
| COUPON | 100 | 25 pt |
| SPECIAL | 72 | 15 pt |
| DRINK | 72 | 15 pt |
| ⋮ | ⋮ | |

PRINT SIZE: VERTICAL 297 mm × HORIZONTAL 210 mm

SUBJECT SCORE TABLE

| WORD | SUBJECT SCORE | FONT SIZE |
|---|---|---|
| FREE | 100 | 105 pt |
| DRINK | 100 | 105 pt |
| ACCEPTANCE | 100 | 72 pt |
| TERM | 83 | 72 pt |
| EXTENSION | 83 | 72 pt |
| ⋮ | ⋮ | |

PRINT SIZE: VERTICAL 58 mm × HORIZONTAL 101 mm

SUBJECT SCORE TABLE

| WORD | SUBJECT SCORE | FONT SIZE |
|---|---|---|
| FREE | 100 | 25 pt |
| DRINK | 100 | 25 pt |
| COUPON | 100 | 25 pt |
| SPECIAL | 72 | 15 pt |
| DRINK | 72 | 15 pt |
| ⋮ | ⋮ | |

MANAGEMENT APPARATUS, DESIGN MANAGEMENT METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-119683 filed Jun. 10, 2014.

BACKGROUND (i) Technical Field

The present invention relates to a design management apparatus, a design management method, and a non-transitory computer readable medium.

(ii) Related Art

Technologies to create designs for flyers, advertisements, direct mails (DMs), posters, catalogs, postcards, and so on are known. For example, templates of multiple kinds having different designs may be prepared in advance and users may select and edit templates to create the designs.

SUMMARY

According to an aspect of the invention, there is provided a design management apparatus including a calculation unit and an output unit. The calculation unit receives multiple templates that are used to create designs and that include multiple character strings serving as predetermined samples to calculate a score for each character string in each template, which concerns a subject of the template and which corresponds to a size of the character string. The output unit receives information indicating a search subject to output the template including the character string which corresponds to the search subject and the score of which meets an output condition.

BRIEF DESCRIPTION OF THE DRAWINGS

Exemplary embodiments of the present invention will be described in detail based on the following figures, wherein.

DETAILED DESCRIPTION

Figure 1:
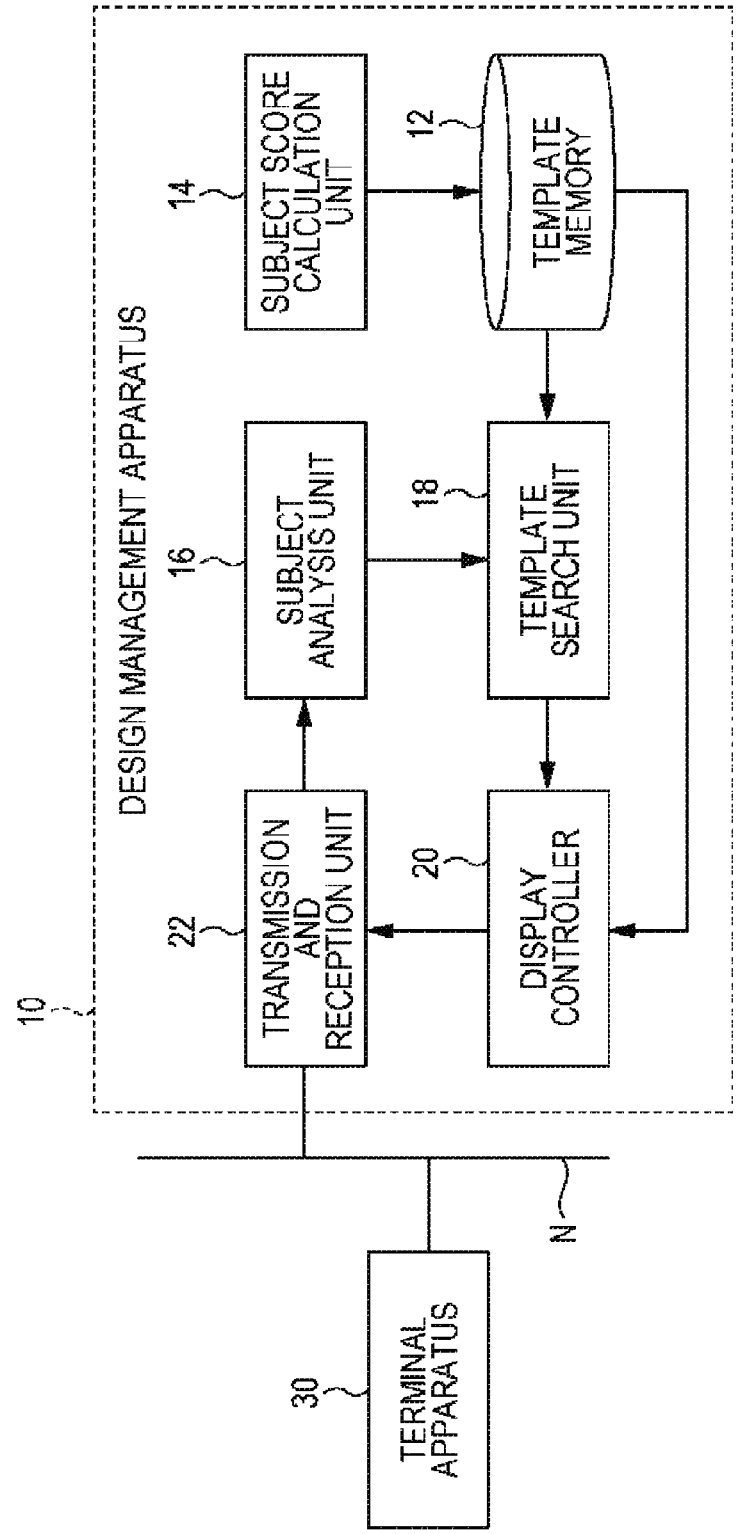
FIG. 1 is a block diagram illustrating an exemplary configuration of a design management system according to an exemplary embodiment of the present invention.

FIG. 1 is a block diagram illustrating an exemplary configuration of a design management system according to an exemplary embodiment of the present invention. The design management system according to the present exemplary embodiment includes, for example, a design management apparatus 10 and a terminal apparatus 30. The design management apparatus 10 according to the present exemplary embodiment is connected to the terminal apparatus 30, for example, via a communication path N, such as a network. Although one terminal apparatus 30 is connected to the design management apparatus 10 via the communication path N in the example illustrated in FIG. 1, multiple terminal apparatuses 30 may be connected to the terminal apparatus 30 via the communication path N.

The design management apparatus 10 stores templates (template data) used to create designs and has a function to provide a template in response to a request from a user. The design management apparatus 10 has a function to transmit and receive data to and from the terminal apparatus 30.

The terminal apparatus 30 is, for example, a personal computer (PC), a tablet PC, a smartphone, or a mobile phone. The terminal apparatus 30 includes an operation unit including a keyboard and a mouse, a display unit functioning as a display, a transmission and reception unit functioning as a network interface, and a controller including a central processing unit (CPU). The terminal apparatus 30 has a function to transmit and receive data to and from the design management apparatus 10. The terminal apparatus 30 is used by, for example, a user who edits a template to create a design. The template is transmitted from the design management apparatus 10 to the terminal apparatus 30 to be displayed in the display unit in the terminal apparatus 30. The template is edited by the user. The terminal apparatus 30 may be incorporated in the design management apparatus 10.

The design management apparatus 10 will now be described in detail. Referring to FIG. 1, the design management apparatus 10 includes a template memory 12, a subject score calculation unit 14, a subject analysis unit 16, a template search unit 18, a display controller 20, and a transmission and reception unit 22.

The template memory 12 stores real data (template data) about templates of multiple kinds having different designs. The templates are data about design models for flyers, advertisements, direct mails (DMs), posters, catalogs, postcards, and so on.

Each template is composed of, for example, one or more design parts (design part data) (objects). The design parts include, for example, character parts, image parts, and graphic parts. Each of the character parts is composed of a character string and the character parts include, for example, a character part of a title and a character part of a text. Each of the image parts is, for example, bitmap image data. Each of the graphic parts is, for example, graphic data represented in a vector format. The templates include, for example, text data indicating the character parts, image data indicating the image parts, graphic data indicating the graphic parts, and data including data capacity information about each piece of data and arrangement position information about each design part.

Each design part included in each template is the design part serving as a sample that is created in advance. The design part serving as a sample is, for example, data created in advance by a provider of the template. The design part serving as a sample is edited by the user in order to create the design based on the template. The template may include the design parts the editing of which by the user is prohibited, in addition to the design parts the editing of which by the user is permitted. For example, the character parts (texts)

may be the design parts the editing of which by the user is permitted and the image parts may be the design parts the editing of which by the user is prohibited. The editing of the image parts by the user may be permitted.

In the editing of the template, the user uses the terminal apparatus 30 to edit the content of each design part. The editing includes processing and modification of the content of the design part. For example, as for the character part of the title and the character part of the text, the character string, the font type, the font size, the color of characters, the arrangement positions of the characters, and so on are edited by the user. As for the image part, the design of the image, the kind of the image, the size of the image, the arrangement position of the image, and so on are edited by the user. As for the graphic part, the color of the graphic, the transparency (the degree of shadow) of the graphic, the size of the graphic, the arrangement position of the graphic, and so on are edited by the user. The design parts serving as the samples are edited by the user in the above manner to edit the design of the template in order to create a new design. In other words, in the system according to the present exemplary embodiment, a new design is created by the user on the basis of the template.

The template that is newly created on the basis of the template may be stored in the template memory 12. The original template may be hereinafter referred to as a "base template" and the template created on the basis of the base template may be hereinafter referred to as called a "derived template."

Template attribute information is associated with each template in advance. The template attribute information includes, for example, template identification information, creation date and time information, registration date and time information, base template information, print size information, and subject information.

The template identification information is used for identifying each template and is, for example, an identifier (ID) or a design name. The creation date and time information indicates the date and time when the template is created. The registration date and time information indicates the date and time when the template is registered.

The print size information indicates the size (dimensions) of the template to be actually printed on a recording medium, such a sheet of paper, or the size (dimensions) of the recording medium. The print size has a predetermined value and may be varied in the printing.

The base template information is included in the template attribute information about the derived template and is the template identification information about the base template on which the creation of the derived template is based. In other words, the template identification information about the base template (parent template) is included in the template attribute information about the derived template (child template). For example, when the base template is edited to create the derived template in the terminal apparatus 30, the template identification information about the base template is included in the template attribute information about the derived template.

The subject information is information concerning the subject of the template with which the template attribute information including the subject information is associated. The subject information is generated by the subject score calculation unit 14 described below.

The subject score calculation unit 14 calculates a score (hereinafter referred to as "subject score") of each character string included in the template, which concerns the subject of the template, on the basis of the font size of the character string. For example, the subject score has a higher value with the increasing font size of the character string. The subject score is an evaluation value indicating the degree of the subject of the template. The character string having a higher subject score is estimated to well represent the subject (the content which is most intended to be presented to a viewer) of the template including the character string. The subject score is a value on which selection of the template to be provided to the terminal apparatus 30 is based. The subject score calculation unit 14 calculates the subject score of each character string included in each template. The subject score is included in the template attribute information as an example of the subject information.

The subject analysis unit 16 receives the character string that is used for searching for the template and that concerns the subject of the template (hereinafter referred to as a "search subject character string") and analyzes the search subject character string to determine a "search word" used in the search in the template search unit 18 described below. The search subject character string is, for example, input by the user with the terminal apparatus 30. For example, the subject analysis unit 16 determines a semanteme (meaning) of the search subject character string using a thesaurus to extract one or more similar phrases having the same semanteme as that of the search subject character string from the thesaurus. The subject analysis unit 16 divides the extracted similar phrase into words to adopt each noun in the words resulting from the division as the "search word." The thesaurus may be stored in advance in a memory (not illustrated) in the design management apparatus 10 or may be stored in an external apparatus.

The template search unit 18 searches the template memory 12 for the template using the search subject character string to supply the template to the display controller 20. For example, the template search unit 18 acquires the template including the character string which corresponds to the search subject character string and the score of which meets an output condition from the template memory 12 to supply the template to the display controller 20. More specifically, the template search unit 18 acquires the template including the character string which coincides with the search word and the subject score of which is higher than or equal to a score reference value from the template memory 12 to supply the template to the display controller 20. The template search unit 18 may search the base template and the derived template for the template or may search the base template or the derived template for the template. The score reference value is, for example, a predetermined value and may be varied.

The display controller 20 performs control for displaying the template in the terminal apparatus 30. The display controller 20 has, for example, a function to cause the terminal apparatus 30 to display thumbnail images (reduced images) of multiple templates, a function to cause the terminal apparatus 30 to display the template searched for by the template search unit 18 or the thumbnail image of the template, and a function to cause the terminal apparatus 30 to display the template specified by the user. Specifically, the display controller 20 transmits the template to be displayed or the thumbnail image of the template and information for display to the terminal apparatus 30 with the transmission and reception unit 22. The terminal apparatus 30 displays the template to be displayed or the thumbnail image of the template in the display unit in accordance with the information for display. The thumbnail image of the template may be created in advance and may be stored in the template memory 12 or may be created from the template by the display controller 20 in the display of the thumbnail image.

The display controller 20 may have a function to transmit the template attribute information about the template to be displayed to the terminal apparatus 30 with the transmission and reception unit 22 to cause the terminal apparatus 30 to display the template attribute information.

The transmission and reception unit 22 is a network interface. The transmission and reception unit 22 has a function to transmit and receive data to and from the terminal apparatus 30. For example, the transmission and reception unit 22 receives the information indicating the search subject character string from the terminal apparatus 30 via the communication path N and supplies the information to the subject analysis unit 16. The transmission and reception unit 22 transmits the template or the thumbnail image of the template to the terminal apparatus 30 via the communication path N.

The subject score calculation unit 14 may determine the character string representing the subject of the template (hereinafter referred to as a "subject character string") from the multiple character strings included in the template on the basis of the font size of each character string included in the template. In an example, the subject score calculation unit 14 determines the character string having the largest font size, among the multiple character strings included in the template, to be the subject character string. In another example, the subject score calculation unit 14 may determine the character string the font size of which is larger than or equal to a reference value to be the subject character string. In this case, multiple character strings may be determined to be the subject character strings for the same template. The subject character string is the character string on which the selection of the template to be provided to the terminal apparatus 30 is based. The subject character string is included in the template attribute information about the template as an example of the subject information. When the subject character string is determined in the above manners, the template search unit 18 may acquire the template including the subject character string coinciding with the search word from the template memory 12 to supply the template to the display controller 20.

The design management apparatus 10 may have a function to edit the template. In this case, the design management apparatus 10 edits the template specified by the user in accordance with an edition instruction from the terminal apparatus 30.

The design management apparatus 10 described above is, for example, realized by cooperation of hardware resources and software. Specifically, the design management apparatus 10 includes a processor, such as a CPU, which is not illustrated. The processor reads out a program stored in a memory (not illustrated) for execution to realize the function of each component in the design management apparatus 10. The program is stored in the memory via a recording medium, such as a compact disc (CD) or a digital versatile disk (DVD), or via a communication path, such as a network. Each component in the design management apparatus 10 may be realized by a hardware resource, such as a circuit.

Figure 2:
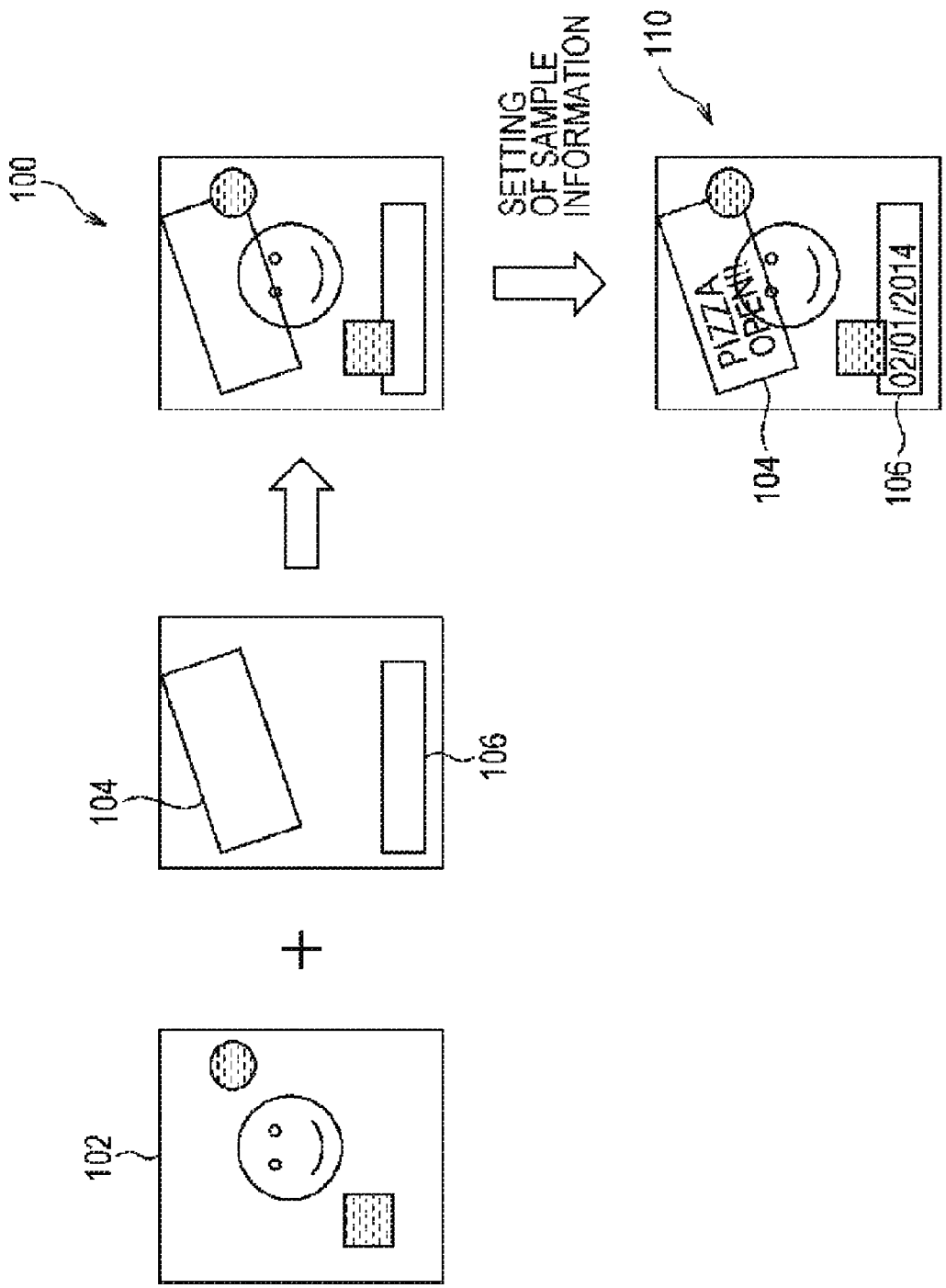
FIG. 2 illustrates an exemplary configuration of templates.

FIG. 2 illustrates exemplary templates. Referring to FIG. 2, a template 100 includes, for example, an image part 102 (image data) the editing of which by the user is prohibited and areas 104 and 106 the editing of which by the user is permitted. In the example illustrated in FIG. 2, the areas 104 and 106 correspond to the character parts and character strings are input into the areas 104 and 106. For example, sample character strings (sample information) are input in advance into the areas 104 and 106 and a template 110 including the sample information is stored in the template memory 12. The character strings in the areas 104 and 106 are edited by user to create a new design based on the template 110.

Figure 3:
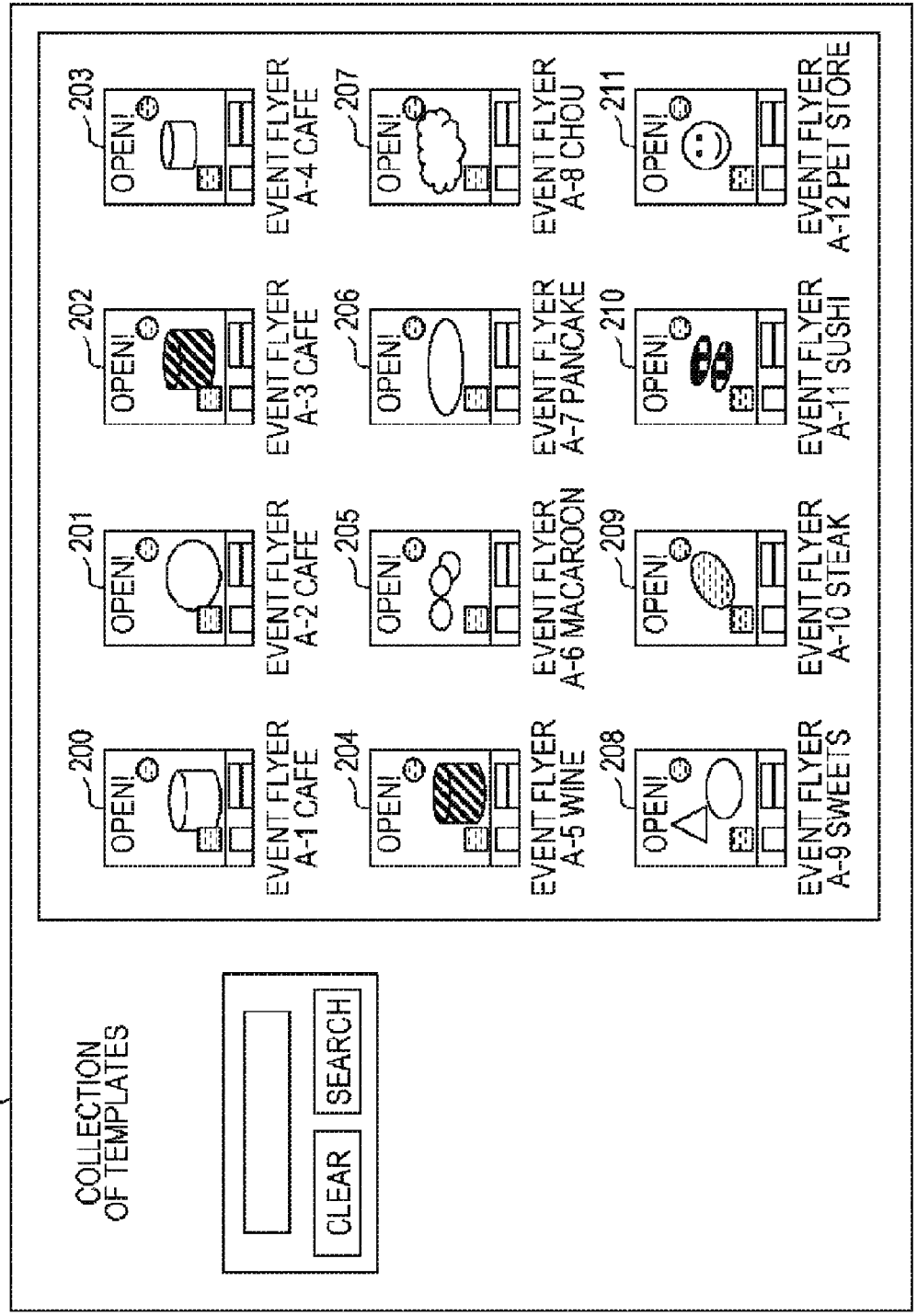
FIG. 3 illustrates an exemplary screen on which multiple templates are displayed.

FIG. 3 illustrates an example of how the templates are displayed. For example, when the user logs on the design management apparatus 10 using the terminal apparatus 30, the display controller 20 causes the display unit in the terminal apparatus 30 to display the thumbnail images of multiple templates. In the example illustrated in FIG. 3, the thumbnail images of templates 200 to 211 are displayed on a screen 30A of the display unit in the terminal apparatus 30.

For example, upon specification of a specific template, among the templates 200 to 211, by the user with the operation unit in the terminal apparatus 30 and issuance of a display instruction, the template identification information about the specified template and information indicating the display instruction are transmitted from the terminal apparatus 30 to the design management apparatus 10. The display controller 20 causes the display unit in the terminal apparatus 30 to enlarge the specified template for display in accordance with the display instruction. The display controller 20 may cause the display unit in the terminal apparatus 30 to display the template attribute information about the specified template. For example, upon specification of the thumbnail image of the template 200 by the user, the template 200 is enlarged for display in the display unit in the terminal apparatus 30. Here, the template attribute information about the template 200 may also be displayed in the display unit in the terminal apparatus 30, along with the template 200.

Upon selection a template to be edited by the user with the operation unit in the terminal apparatus 30 and issuance of an editing instruction, the template to be edited is displayed in the display unit in the terminal apparatus 30 and the design management system is in a state in which the editing by the user is permitted. The user edits the template to be edited with the operation unit in the terminal apparatus 30 to create a new design (corresponding to the derived template) based on the template.

Figure 4:
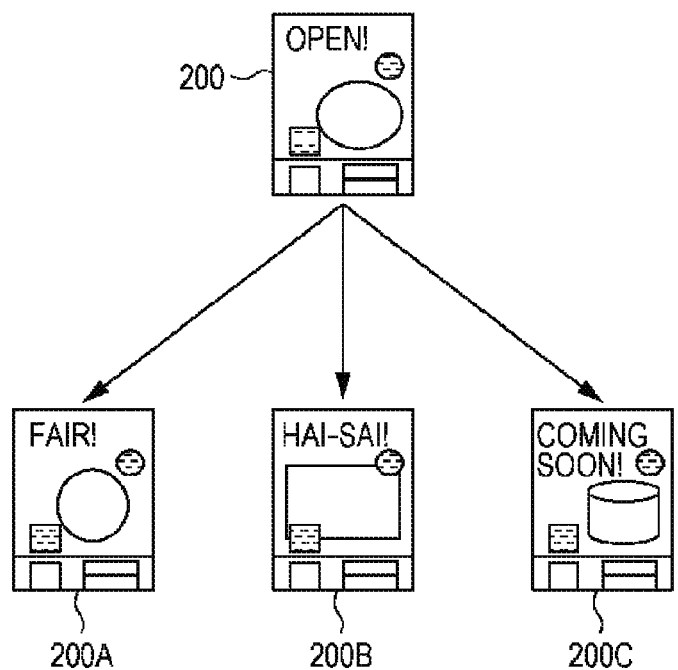
FIG. 4 illustrates an example of a base template and derived templates.

FIG. 4 illustrates an example of the base template and the derived templates. In the example illustrated in FIG. 4, the template 200 is the base template and templates 200A, 200B and 200C are the derived templates created on the basis of the template 200. For example, the user edits the template 200 to create the templates 200A, 200B, and 200C. The template identification information about the template 200 is included in the template attribute information about each of the templates 200A, 200B, and 200C as the base template information. The template 200, which is the base template, is identified with reference to the template attribute information about each of the templates 200A, 200B, and 200C.

Figure 5:
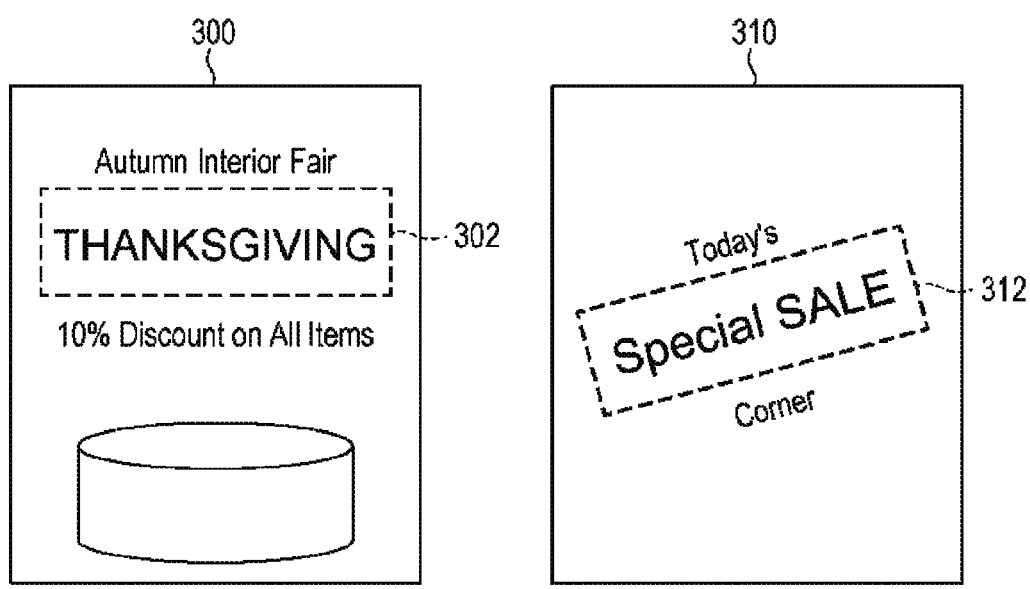
FIG. 5 illustrates exemplary templates.

An exemplary process performed by the subject score calculation unit 14 will now be described with reference to FIGS. 5A and 5B. In the examples illustrated in FIGS. 5A and 5B, the subject score calculation unit 14 determines the character string having the largest font size, among the multiple character strings included in the template, to be the subject character string. Specifically, when a character string 302 ("THANKSGIVING") included in a template 300 has the largest font size, among the font sizes of the character strings included in the template 300, as in an example in FIG. 5, the subject score calculation unit 14 determines the character string 302 to be the subject character string. When a character string 312 ("Special SALE") included in a template 310 has the largest font size, among the font sizes of the character strings included in the template 310, as in an example in FIG. 5, the subject score calculation unit 14 determines the character string 312 to be the subject character string. In these cases, the template search unit 18 acquires the template including the subject character string coinciding with the search word from the template memory 12 to supply the acquired template to the display controller 20. For example, when the search word is "THANKSGIVING", the template search unit 18 acquires the template 300 including the character string 302, which is the subject character string, from the template memory 12 to supply the acquired template 300 to the display controller 20. The display controller 20 transmits the template 300 to the terminal apparatus 30 with the transmission and reception unit 22 to cause the display unit in the template 300 to display the template 300. When the search word is "Special SALE", the template search unit 18 acquires the template 310 including the character string 312, which is the subject character string, from the template memory 12 to supply the acquired template 310 to the display controller 20.

The content which is most intended to be presented to the viewer (the subject) may be set so as to draw most attention from the viewer in the template. For example, representing the content, which is the subject, with the largest font size in the template causes the viewer to easily pay attention to the content, which is the subject. Accordingly, in the present exemplary embodiment, the character string having the largest font size in the template is determined to be the subject character string and the template including the subject character string coinciding with the search word is provided to the terminal apparatus 30. Consequently, the use of the character string indicating the subject of the design desired by the user as the search subject character string causes the template which includes the character string coinciding with or close to the subject of the design desired by the user and in which the character string is set so as to draw attention of the viewer to be provided to the terminal apparatus 30. The creation of the designs for, for example, flyers, advertisements, direct mails (DMs), and posters on the basis of the templates supplied in the above manner causes the content which is most intended to be presented to the viewer (the subject) to be represented with the font having the largest size.

The process performed by the subject score calculation unit 14 will now be described in detail with reference to FIG. 6. How the subject score is calculated is described here. First, the subject score calculation unit 14 performs syntax analysis to each character string included in the template to divide the character string into words. In the present exemplary embodiment, when the word is a numeral (for example, "ONE") or a proper name (for example, "Chicago"), the word is excluded from the calculation targets. In a template 320 illustrated in FIG. 6, the subject score calculation unit 14 performs the syntax analysis to the character string "FREE ONE DRINK COUPON" to divide the character string "FREE ONE DRINK COUPON" into the word "FREE", the word "ONE", the word "DRINK", and the word "COUPON" (divide the character string "FREE ONE DRINK COUPON" into the words surrounded by broken lines). The character string "Special Drink" is divided into the word "Special" and the word "Drink" (divide the character string "Special Drink" into the words surrounded by broken lines). The same applies to the other character strings.

For example, it is assumed that the font size of the character string "FREE ONE DRINK COUPON" is "25 pt", the font size of the character string "Special Drink" is "15 pt", and the font size of the character string "Restaurant" is "7 pt." The font size "25 pt" of the character string "FREE ONE DRINK COUPON" is the largest font size in the template 320. The font size "7 pt" of the character string "Restaurant" is the smallest font size in the template 320. Since the word "ONE" is a numeral, the word "ONE" is excluded from the calculation targets.

Next, the subject score calculation unit 14 calculates the subject score normalized for every template of each word. For example, the subject score calculation unit 14 calculates the normalized subject score of the word to be calculated using the largest font size, the smallest font size, and the font size of the word to be calculated in the same template (for example, the template 320). Specifically, the subject score calculation unit 14 calculates the subject score of each word according to the following equation (1) where the score of the largest font size is set to 100 points and the score of the smallest font size is set to 50 points:

$$\text{The subject score} = [50 + 50 \times [(A-B)/(C-B)]] \quad (1)$$

wherein "A" denotes the font size of the word to be calculated, "B" denotes the smallest font size (7 pt) in the template 320, and "C" denotes the largest font size (25 pt) in the template 320.

A part [(A−B)/(C−B)] in the equation (1) is a coefficient determined by the largest font size, the smallest font size, and the font size of the word to be calculated. The coefficient is increased to be close to "one" with the increasing font size of the word to be calculated. As a result, the subject score is close to 100 points with the increasing font size. The subject score normalized with the largest font size and the smallest font size in the same template is calculated according to the equation (1) in the above manner.

For example, the subject score of the words "Special" and "Drink" (the font size of them is 15 pt) has the following value:

$$\text{The subject score} = [50 + 50 \times [(15-7)/(25-7)]] = 72$$

Since the words "FREE", "DRINK" and "COUPON" have the largest font size, the subject score of these words is 100 points. Since the word "Restaurant" has the smallest font size, the subject score of the word "Restaurant" is 50 points.

Figures 6, 7:
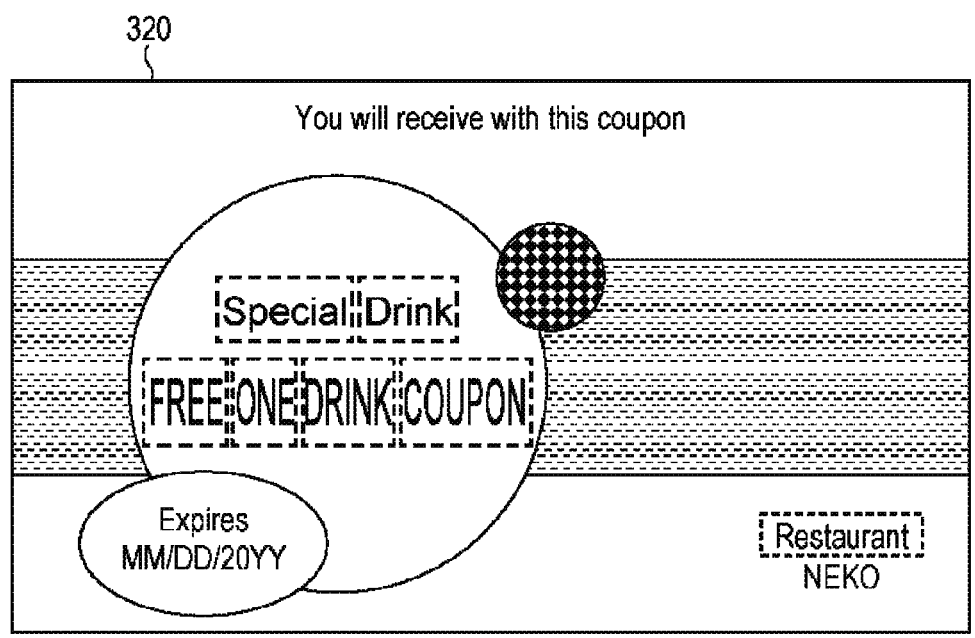
FIG. 6 illustrates an exemplary template.
FIG. 7 illustrates an exemplary subject score table.

FIG. 7 illustrates an exemplary subject score table. The subject score table includes items "WORD", "SUBJECT SCORE", and "FONT SIZE" and the subject score and the font size of each word are indicated in the subject score table. The subject score table illustrated in FIG. 7 is a list of the subject scores of the respective words included in the template 320 illustrated in FIG. 6.

The subject score calculation unit 14 calculates the subject score of each word in each template to create the subject score table for each template. The subject score table is included in the template attribute information about the template as the subject information. For example, the subject score table illustrated in FIG. 7 is included in the template attribute information about the template 320. The subject score table may be associated with the template, separately from the template attribute information.

The coefficient of the subject score is varied with the largest font size and the smallest font size in the template. Accordingly, since the coefficient is varied with the template when different templates have different largest font sizes and different smallest font sizes, the words of the same font size have different subject scores in different templates. For example, in the examples illustrated in FIG. 6 and FIG. 7, the subject score is 72 points when the font size of the word "Special" is "15 pt." This subject score is a value calculated under a condition in which the largest font size is "25 pt" and the smallest font size is "7 pt" in the template 320. If the font size of the word "Special" is "15 pt" and the largest font size is "15 pt" in a template different from the template 320, the subject score of the word "Special" is 100 points. The words of the same font size may have different subject scores in different templates, as described above. In other words, the subject score is a value normalized for every template and a relative value in multiple templates.

Figure 8:
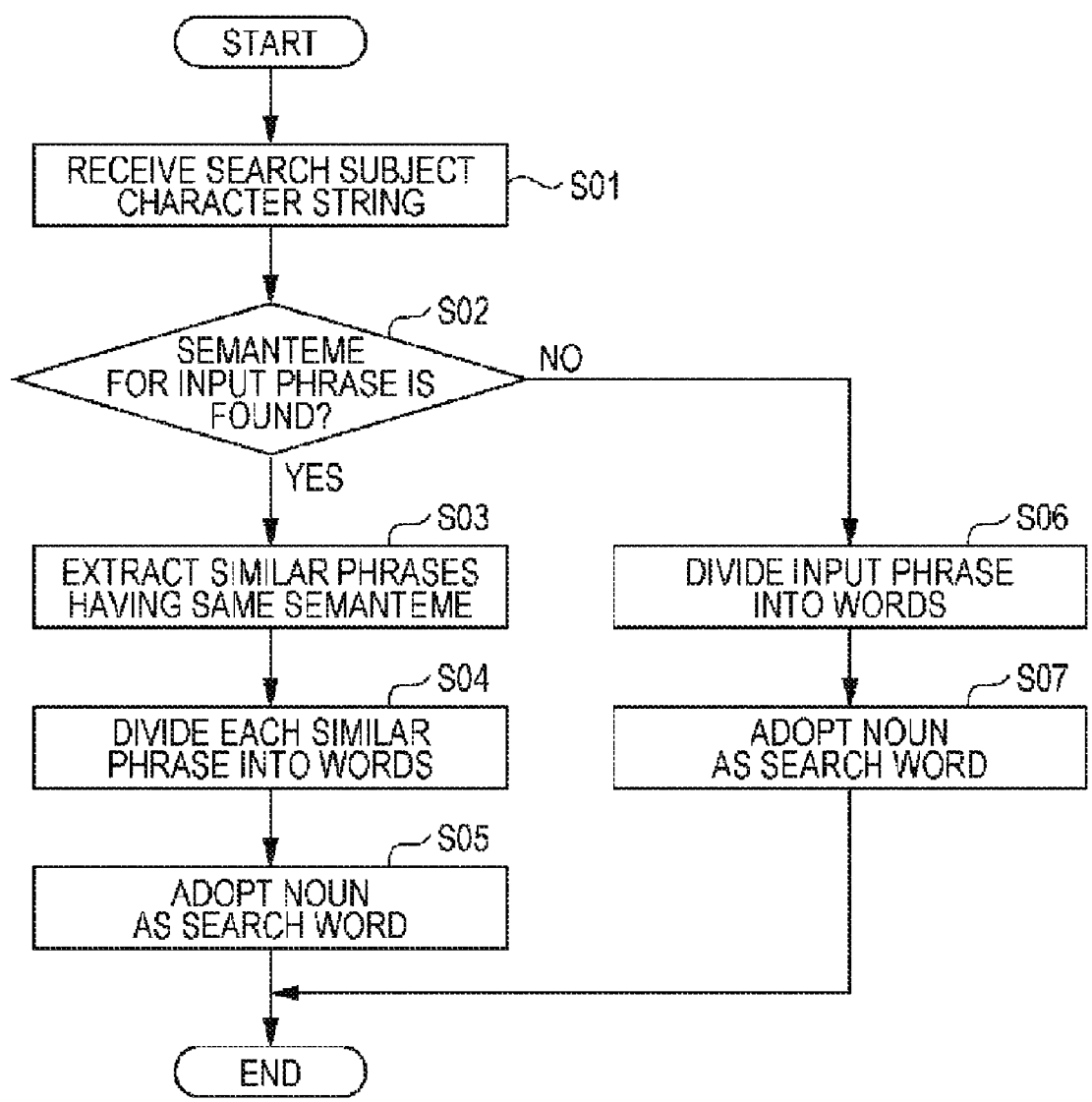
FIG. 8 is a flowchart illustrating an exemplary process to determine a search word.

An exemplary process performed by the subject analysis unit 16 will now be described with reference to a flowchart in FIG. 8. Referring to FIG. 8, upon input of the search subject character string by the user with the terminal apparatus 30 to instruct the design management system to search for the template, in Step S01, the information indicating the search subject character string is transmitted from the terminal apparatus 30 to the design management apparatus 10. For example, it is assumed that a character string "open a store" is input by the user as the search subject character string. The subject analysis unit 16 determines the semanteme (meaning) of the search subject character string "open a store" using the thesaurus. The semanteme of the search subject character string "open a store" is, for example, "opening of a store." In Step S02, it is determined whether the semanteme "opening of a store" corresponding to the search subject character string "open a store" is found. If the semanteme "opening of a store" corresponding to the search subject character string "open a store" is found (YES in Step S02), the process goes to Step S03. In Step S03, the subject analysis unit 16 extracts similar phrases having the same semanteme "opening of a store" as that of the search subject character string "open a store" from the thesaurus. The similar phrases include, for example, "hang out one's shingle", "open a house", "open a shop", "open", "establish a shop", "start a business", "begin business", "set up a shop", "open one's own store", "set up one's own store", and "open a shutter." In Step S04, the subject analysis unit 16 divides each similar phrase that is extracted into words. In Step S05, the subject analysis unit 16 adopts a noun in each word resulting from the division as the search word. In the above example, for example, "store", "shop", "shingle", "house", "business", and "shutter" are adopted as the search words. If no semanteme corresponding to the search subject character string "open a store" is found (NO in Step S02), the process goes to Step S06. In Step S06, the subject analysis unit 16 divides the search subject character string "open a store" into words. In Step S07, the subject analysis unit 16 adopts a noun in each word resulting from the division as the search word. For example, "store" is adopted as the search word.

An exemplary process performed by the template search unit 18 will now be described in detail. The template search unit 18 refers to the subject score table of each template stored in the template memory 12 to acquire the template including the "word" which coincides with the "search word" determined by the subject analysis unit 16 and the subject score of which is higher than or equal to the score reference value from the template memory 12. In the above example, the template search unit 18 acquires the template including the "word" which coincides with the "search word", such as "store", "shop", "shingle", "house", "business", or "shutter", and the subject score of which is higher than or equal to the score reference value (for example, 80 points) from the template memory 12. The template acquired by the template search unit 18 is supplied to the display controller 20.

The display controller 20 causes the display unit in the terminal apparatus 30 to display the template acquired by the template search unit 18. The display controller 20 may cause the display unit in the terminal apparatus 30 to display multiple templates in the descending order of the subject scores.

Figure 9:
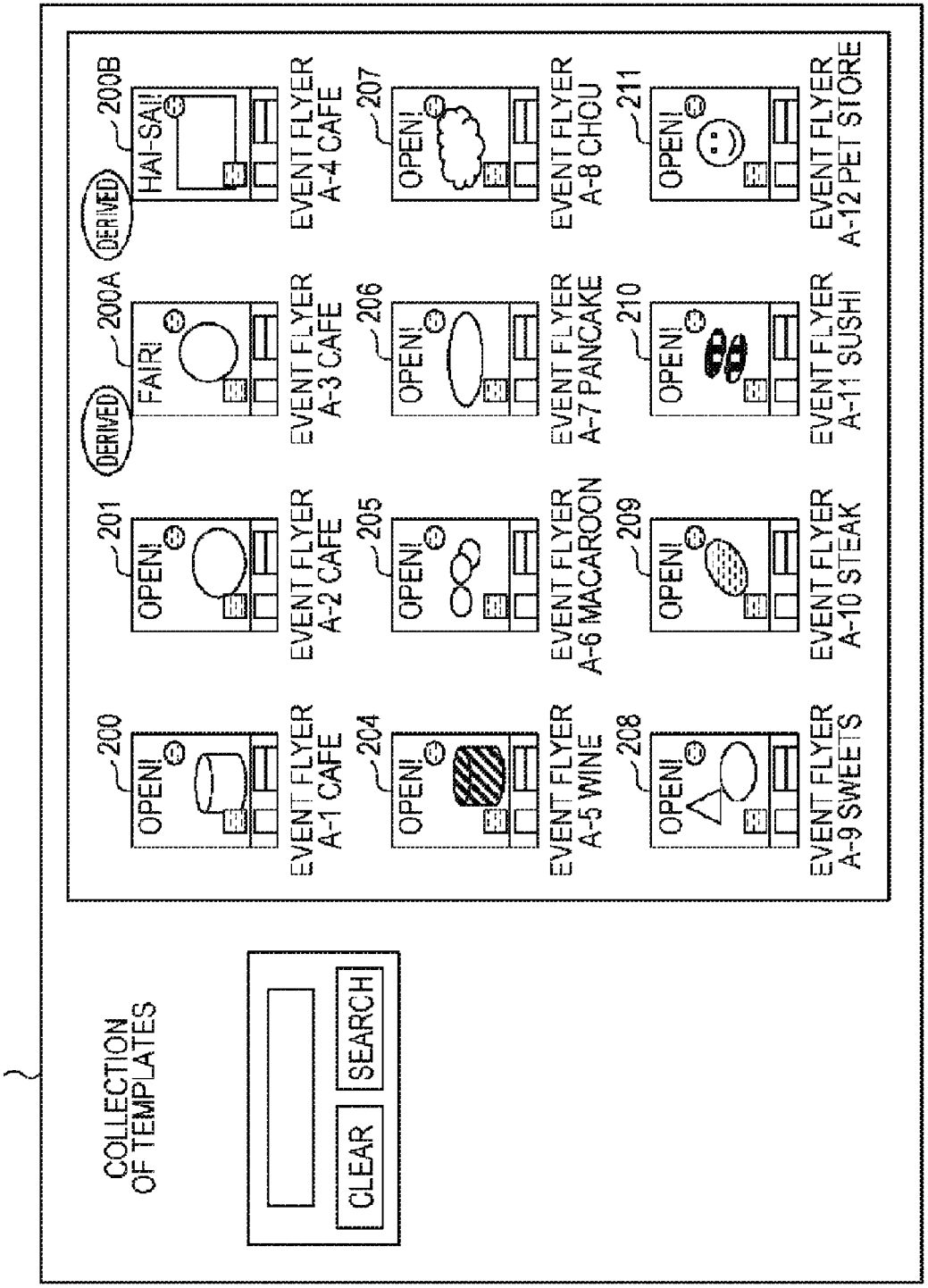
FIG. 9 illustrates an exemplary screen on which multiple templates are displayed.

FIG. 9 illustrates an example of how the templates searched for by the template search unit 18 are displayed. Upon input of the search subject character string by the user with the terminal apparatus 30 to instruct the design management system to search for the template, the templates that are searched for are displayed on the screen 30A of the display unit in the terminal apparatus 30. In the example illustrated in FIG. 9, the thumbnail images of the templates 200, 201, and 204 to 211 and templates 200A and 200B are displayed on the screen 30A of the display unit in the terminal apparatus 30. The display controller 20 causes the display unit in the terminal apparatus 30 to display the thumbnail images of the templates 200, 201, 200A, 200B, and 204 to 211 in the descending order of the subject scores. For example, the display controller 20 causes the display unit in the terminal apparatus 30 to display the templates having higher subject scores in upper and left-side portions on the screen 30A. The display controller 20 may cause the display unit in the terminal apparatus 30 to display information (for example, a mark) indicating that the template is the derived template near the thumbnail image of the derived template. In the example illustrated in FIG. 9, since the templates 200A and 200B are the derived templates, a mark indicating that each of the templates is the derived template is displayed near the templates 200A and 200B. Information indicating that the template is the base template may be displayed for the base template or the information may not be displayed for the base template. In the example illustrated in FIG. 9, the information indicating that the templates are the base templates is not displayed for the base templates.

Upon specification of a specific template by the user with the operation unit in the terminal apparatus 30 to issue the display instruction, the specified template is enlarged for display in the display unit in the terminal apparatus 30. The template attribute information about the specified template may also be displayed.

The template search unit 18 may acquire all the templates including the word coinciding with the search word from the template memory 12 and the display controller 20 may cause the display unit in the terminal apparatus 30 to display the templates in the descending order of the subject scores.

Figure 10:
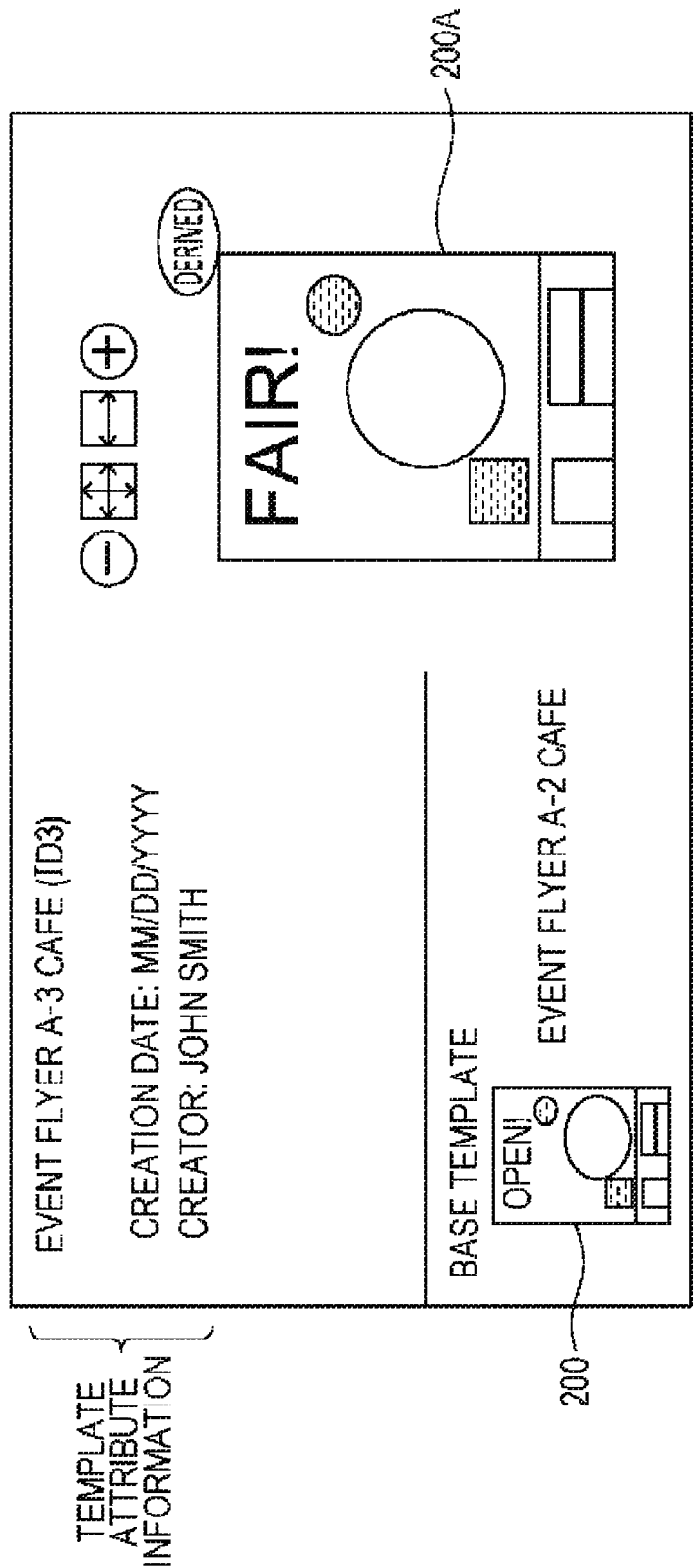
FIG. 10 illustrates an exemplary template.

FIG. 10 illustrates an example of how the derived template is displayed. For example, upon specification of the thumbnail image of the template 200A, which is the derived template, by the user on the screen 30A illustrated in FIG. 9, the template 200A is enlarged for display in the display unit in the terminal apparatus 30, as illustrated in FIG. 10. The template attribute information about the template 200A is also displayed. The template 200 (the base template) on which the creation of the template 200A is based may also be displayed. Upon issuance of the editing instruction by the user with the operation unit in the terminal apparatus 30, the design management system enters a state in which the editing of the template 200A is permitted. The editing of the template 200A creates a new design based on the template 200A.

The content which is intended to be presented to the viewer may be set so as to draw attention of the viewer in the template. For example, the content of the subject draws more attention of the viewer with the increasing font size of the character string representing the content of the subject.

Accordingly, the character string having the larger font size is estimated to well represent the content of the subject. Since the subject score is increased with the increasing font size of the word, the word having the higher subject score is estimated to well represent the content of the subject. In the present exemplary embodiment, the template including the word which coincides with the search word and the subject score of which is higher than or equal to the score reference value is provided to the terminal apparatus 30. Accordingly, the use of the character string indicating the subject of the design desired by the user as the search subject character string causes the template which includes the word coinciding with or close to the subject of the design desired by the user and in which the word is set so as to draw attention of the viewer to be provided to the terminal apparatus 30. The creation of the designs for, for example, flyers, advertisements, direct mails (DMs), and posters on the basis of the template provided in the above manner causes the content which is intended to be presented to the viewer to be represented with the font having the relatively large size.

According to the present exemplary embodiment, upon input of the search subject character string indicating the subject desired by the user into the terminal apparatus 30, for example, even if the user has poor knowledge of the design, the template which includes the word coinciding with or close to the subject of the design desired by the user and in which the word is set so as to draw attention of the viewer is provided to the terminal apparatus 30.

The provision of the derived template coinciding with or close to the subject of the design desired by the user to the terminal apparatus 30 provides the specific image of the design created from the base template to the user. This allows the user to easily understand the image of the design created from the base template.

When multiple templates including the same word having the same subject score value are displayed, priority may be given to the template in which the corresponding word has the larger font size over the other templates for display. This process will now be described in detail with reference to FIGS. 11A and 11B and FIGS. 12A and 12B.

Figures 11A, 11B:
FIG. 11A illustrates an exemplary template and FIG. 11B illustrates an exemplary subject score table.

A subject score table illustrated in FIG. 11B is the subject score table for a template 500 illustrated in FIG. 11A. As illustrated in the subject score table in FIG. 11B, the subject score of the word "FREE" is 100 points. The real size in the printing of the template 500 is, for example, vertical 297 mm×horizontal 210 mm.

Figures 12A, 12B:
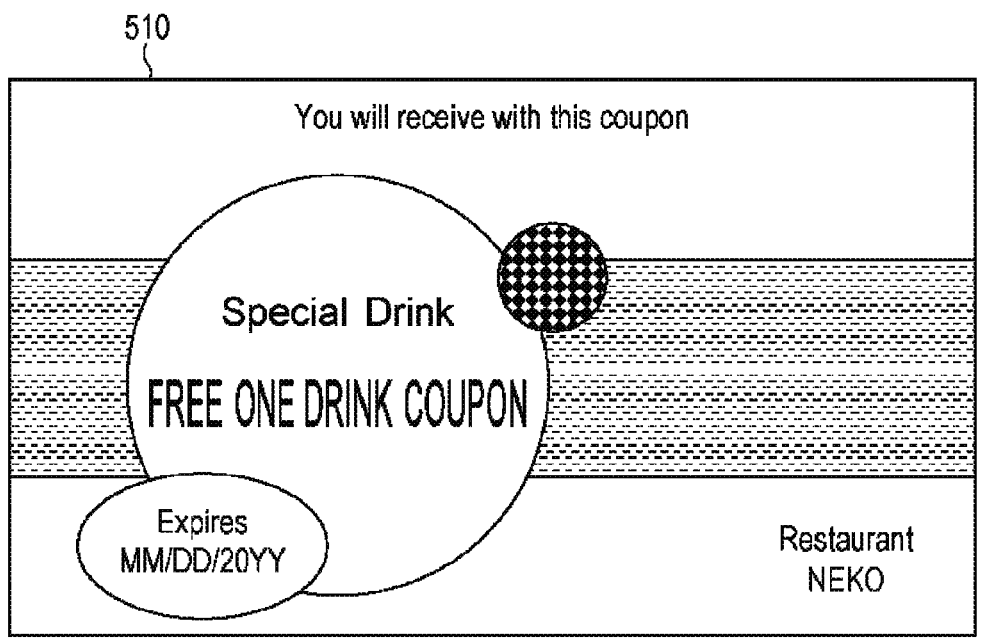
FIG. 12A illustrates an exemplary template and FIG. 12B illustrates an exemplary subject score table.

A subject score table illustrated in FIG. 12B is the subject score table for a template 510 illustrated in FIG. 12A. As illustrated in the subject score table in FIG. 12B, the subject score of the word "FREE" is 100 points. The real size in the printing of the template 510 is, for example, vertical 58 mm×horizontal 101 mm.

As described above, the subject score of the word "FREE" is 100 points in both of the templates 500 and 510. The real size of the template 500 in the printing is larger than the real size of the template 510 in the printing. The font size of the word "FREE" in the template 500 is "105 pt" and the font size of the word "FREE" in the template 510 is "25 pt." In other words, the font size of the word "FREE" in the template 500 is larger than the font size of the word "FREE" in the template 510.

In the above case, the display controller 20 causes the display unit in the terminal apparatus 30 to give priority to the template 500 in which the word "FREE" has the larger font size over the template 510 for display. For example, the display controller 20 causes the display unit in the terminal apparatus 30 to display the thumbnail image of the template 500 in an upper portion on the screen, compared with the thumbnail image of the template 510.

The display of the template having the larger font size preferentially causes the template having the larger real size in the printing to be preferentially displayed. Accordingly, the template is provided to the terminal apparatus 30 upon consideration of the real size in the printing.

Also when multiple templates including the same words the difference in the subject score between which is lower than or equal to a predetermined value are displayed, priority may be given to the template in which the corresponding word has the larger font size over the other templates for display.

The display controller 20 may cause the display unit in the terminal apparatus 30 to give priority to the template the size of which coincides with a specified print size, among the multiple templates including the same word having the same subject score value, over the other templates for display. The information indicating the print size is input by the user, for example, with the operation unit in the terminal apparatus 30. For example, the display controller 20 causes the display unit in the terminal apparatus 30 to display the template the size of which coincides with the specified print size in an upper portion, compared with the other templates, on the screen of the display unit in the terminal apparatus 30. This causes the template the size of which coincides with the print size desired by the user to be preferentially displayed.

When the print size is used as the search condition of the template, the template search unit 18 may acquire the template including the word which coincides with the search word and the subject score of which is higher than or equal to the score reference value, among the templates the sizes of which coincide with the print size, which is the search condition, from the template memory 12 to supply the acquired template to the display controller 20. The information indicating the print size, which is the search condition, is input by the user with, for example, the operation unit in the terminal apparatus 30.

The subject score calculation unit 14 may vary the subject score of the word depending on the degree of decoration of the word. In an example, the subject score calculation unit 14 may vary the subject score of the word depending on the font type of the word. Specifically, the summing point of the subject score based on the font type is determined in advance. The subject score calculation unit 14 adds the summing point based of the font type of the word to the subject score of the word calculated according to the equation (1) to adopt the value resulting from the addition as the proper subject score. In another example, the subject score calculation unit 14 may vary the subject score of the word depending on the tilt of the word. Specifically, the summing point of the subject score based on the tilt of the word is determined in advance. For example, the summing point is increased with the increasing tilt of the word. The subject score calculation unit 14 adds the summing point based on the tilt of the word to the subject score of the word calculated according to the equation (1) to adopt the value resulting from the addition as the proper subject score. In this case, the subject score is increased with the increasing tilt of the word. The addition may be performed to the word the subject score of which is lower than the score reference value (for example, lower than 80 points). For example, the template in which the subject score determined using only the font size is lower than the score reference value (for example, lower than 80 points) may be varied to the template in which the subject score is higher than or equal to the score reference value as the result of the addition and the template in which the subject score is higher than or equal to the score reference value may be provided to the terminal apparatus 30. For example, the word featured in the font type may draw attention of the viewer even if the font size of the word is small. Accordingly, the increase of the subject score depending on the font type and the search for the template using the subject score may provide the template which includes the word coinciding with or close to the subject of the design desired by the user and in which the word is set so as to draw attention of the viewer to the terminal apparatus 30. For example, the word having the large tilt may draw attention of the viewer even if the font size of the word is small. Accordingly, the increase of the subject score depending on the tilt of the word and the search for the template using the subject score may provide the template which includes the word coinciding with or close to the subject of the design desired by the user and in which the word is set so as to draw attention of the viewer to the terminal apparatus 30.

Although the example is described in the above exemplary embodiments in which the subject score is increased with the increasing font size, the subject score may be decreased with the increasing font size. In this case, the word having the lower subject score is estimated to well represent the subject of the template including the word. The template search unit 18 searches for the template including the word which coincides with the search word and the subject score of which is lower than or equal to a predetermined reference value (for example, 20 points or lower) to output the template. Also in this case, the template which includes the word coinciding with or close to the subject of the design desired by the user and in which the word is set so as to draw attention of the viewer is provided to the terminal apparatus 30.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A design management apparatus comprising:
    at least one hardware processor configured to execute modules comprising:
        a calculator configured to:
            receive a plurality of templates that are used to create designs and that include a plurality of character strings serving as predetermined samples; and
            calculate a score for each character string in each template, the score concerning a subject of the template and corresponding to a size of the character string; and
        an outputter configured to:
            receive information indicating a search subject; and
            output a template including a character string which corresponds to the search subject, in response to the calculated score for the character string in the template meeting an output condition.

2. The design management apparatus according to claim 1,
    wherein the calculator is further configured to normalize the score of each character string calculated for every template.

3. The design management apparatus according to claim 1,
    wherein the calculator is further configured to vary the score of the character string depending on a degree of decoration of the character string.

4. The design management apparatus according to claim 2,
    wherein the calculator is further configured to vary the score of the character string depending on a degree of decoration of the character string.

5. The design management apparatus according to claim 1,
    wherein the score is increased in proportion to the size of the character string, and
    wherein the outputter is further configured to receive the character string indicating the search subject and, in response to the calculated score being equal to or higher than a reference value, output the template including the character string which coincides with the character string indicating the search subject and the calculated score.

6. The design management apparatus according to claim 5,
    wherein the outputter is further configured to preferentially output the template including the character string having a higher score.

7. The design management apparatus according to claim 6,
    wherein, among the plurality of templates including identical character strings having equal score values, the outputter is further configured to preferentially output the template including the character string having a larger size.

8. The design management apparatus according to claim 6,
    wherein, among the plurality of templates including identical character strings having equal score values, the outputter is further configured to preferentially output the template having a size coinciding with a specified print size.

9. The design management apparatus according to claim 1,
    wherein the plurality of templates include a base template that is created in advance and a derived template that is created by editing the base template.

10. A non-transitory computer readable medium comprising:
    a storage configured to store a program causing a computer to execute a process comprising:
        receiving a plurality of templates that are used to create designs and that include a plurality of character strings serving as predetermined samples;
        calculating a score for each character string in each template, the score concerning a subject of the template and corresponding to a size of the character string;
        receiving information indicating a search subject; and
        outputting a template including a character string which corresponds to the search subject, in response to the calculated score for the character string in the template meeting an output condition.

11. A design management method comprising:
receiving a plurality of templates that are used to create designs and that include a plurality of character strings serving as predetermined samples;
calculating a score for each character string in each template, the score concerning a subject of the template and corresponding to a size of the character string;
receiving information indicating a search subject; and
outputting the template including a character string which corresponds to the search subject, in response to the calculated score for the character string in the template meeting an output condition.

\* \* \* \* \*